United States Patent
Lazur et al.

(10) Patent No.: US 10,040,094 B2
(45) Date of Patent: Aug. 7, 2018

(54) COATING INTERFACE

(71) Applicant: Rolls-Royce Corporation, Indianapolis, IN (US)

(72) Inventors: Andrew Joseph Lazur, Huntington Beach, CA (US); Kang N. Lee, Zionsville, IN (US); Adam Lee Chamberlain, Mooresville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 404 days.

(21) Appl. No.: 14/212,568

(22) Filed: Mar. 14, 2014

(65) Prior Publication Data

US 2014/0272310 A1    Sep. 18, 2014

Related U.S. Application Data

(60) Provisional application No. 61/791,415, filed on Mar. 15, 2013.

(51) Int. Cl.
*B05D 3/00* (2006.01)
*C23C 4/02* (2006.01)
(Continued)

(52) U.S. Cl.
CPC ............ *B05D 3/002* (2013.01); *C04B 41/009* (2013.01); *C04B 41/50* (2013.01); *C04B 41/85* (2013.01); *C23C 4/02* (2013.01); *C23C 30/00* (2013.01); *F01D 5/288* (2013.01); *F01D 5/282* (2013.01); *F01D 5/284* (2013.01); *F05D 2250/182* (2013.01); *F05D 2250/294* (2013.01);
(Continued)

(58) Field of Classification Search
CPC ......... B05D 3/002; F01D 5/288; F01D 5/284; F01D 5/282; F05D 2300/6033; F05D 2300/175; F05D 2250/182; F05D 2250/294; F05D 2260/36; C23C 30/00; C23C 4/02; Y10T 428/24612; Y10T 428/24545; Y10T 428/24521
See application file for complete search history.

(56) References Cited

U.S. PATENT DOCUMENTS 1,335,002 A    3/1920    Johnson
2,564,497 A    8/1951    Navias
(Continued)

FOREIGN PATENT DOCUMENTS

CA    2525283 A1    5/2006
DE    4341216 A1    6/1995
(Continued)

OTHER PUBLICATIONS

English Translation of DE102005050873. Apr. 26, 2007. accessed Jul. 20, 2016.*
(Continued)

*Primary Examiner* — Nancy Rosenberg Johnson
(74) *Attorney, Agent, or Firm* — Shumaker & Sieffert, P.A.

(57) ABSTRACT

In one example, article comprising a substrate defining an outer surface; a plurality of joint conduits formed in the outer surface of the substrate, wherein each conduit of the plurality of joint conduits exhibits an undercut configuration; and a coating formed on the outer surface of the substrate, wherein the coating substantially fills the plurality of joint conduits formed in the surface of the substrate.

18 Claims, 5 Drawing Sheets

(51) Int. Cl.
  *C23C 30/00* (2006.01)
  *F01D 5/28* (2006.01)
  *C04B 41/85* (2006.01)
  *C04B 41/00* (2006.01)
  *C04B 41/50* (2006.01)

(52) U.S. Cl.
  CPC .... *F05D 2260/36* (2013.01); *F05D 2300/175* (2013.01); *F05D 2300/6033* (2013.01); *Y10T 428/24521* (2015.01); *Y10T 428/24545* (2015.01); *Y10T 428/24612* (2015.01)

(56) References Cited

U.S. PATENT DOCUMENTS

| | | |
|---|---|---|
| 2,686,654 A | 8/1954 | Roush |
| 4,277,522 A | 7/1981 | Dorfeld |
| 4,289,447 A | 9/1981 | Sterman et al. |
| 4,390,320 A | 6/1983 | Eiswerth |
| 4,589,823 A | 5/1986 | Koffel |
| 4,682,933 A | 7/1987 | Wagner |
| 5,030,060 A | 7/1991 | Liang |
| 5,124,006 A | 6/1992 | Fayeulle et al. |
| 5,223,332 A | 6/1993 | Quets |
| 5,264,011 A | 11/1993 | Brown et al. |
| 5,320,879 A | 6/1994 | Bullock |
| 5,368,911 A | 11/1994 | Mannava et al. |
| 5,419,971 A | 5/1995 | Skelly et al. |
| 5,435,889 A | 7/1995 | Dietrich |
| 5,460,002 A | 10/1995 | Correa |
| 5,476,363 A | 12/1995 | Freling et al. |
| 5,520,516 A | 5/1996 | Taylor et al. |
| 5,558,922 A | 9/1996 | Gupta et al. |
| 5,621,968 A | 4/1997 | Kikkawa et al. |
| 5,630,314 A | 5/1997 | Kojima et al. |
| 5,756,217 A | 5/1998 | Schroder et al. |
| 5,830,586 A | 11/1998 | Gray et al. |
| 5,866,271 A | 2/1999 | Stueber et al. |
| 5,985,205 A | 11/1999 | Atmur et al. |
| 5,993,976 A | 11/1999 | Sahoo et al. |
| 5,993,980 A | 11/1999 | Schmitz et al. |
| 5,997,251 A | 12/1999 | Lee |
| 6,027,306 A | 2/2000 | Bunker |
| 6,074,706 A | 6/2000 | Beverley et al. |
| 6,190,124 B1 | 2/2001 | Freling et al. |
| 6,224,963 B1 | 5/2001 | Strangman |
| 6,251,526 B1 | 6/2001 | Staub |
| 6,316,078 B1 | 11/2001 | Smialek |
| 6,382,920 B1 | 5/2002 | Dopper |
| 6,461,107 B1 | 10/2002 | Lee et al. |
| 6,461,108 B1 | 10/2002 | Lee et al. |
| 6,471,881 B1 | 10/2002 | Chai et al. |
| 6,475,316 B1 | 11/2002 | Kirk et al. |
| 6,503,574 B1 | 1/2003 | Skelly et al. |
| 6,511,762 B1 | 1/2003 | Lee et al. |
| 6,526,756 B2 | 3/2003 | Johnson et al. |
| 6,551,061 B2 | 4/2003 | Darolia et al. |
| 6,716,539 B2 | 4/2004 | Subramanian |
| 6,720,087 B2 | 4/2004 | Fried et al. |
| 6,727,005 B2 | 4/2004 | Gimondo et al. |
| 7,220,458 B2 | 5/2007 | Hollis et al. |
| 7,229,253 B2 | 6/2007 | Broderick et al. |
| 7,291,403 B2 | 11/2007 | Nagaraj et al. |
| 7,544,043 B2 | 6/2009 | Eastman et al. |
| 7,704,596 B2 | 4/2010 | Merrill et al. |
| 2001/0004436 A1 | 6/2001 | Chasripoor et al. |
| 2002/0146541 A1 | 10/2002 | Fried |
| 2003/0059309 A1 | 3/2003 | Szucs et al. |
| 2003/0101587 A1 | 6/2003 | Rigney et al. |
| 2003/0170120 A1 | 9/2003 | Grunke et al. |
| 2003/0203224 A1 | 10/2003 | DiConza et al. |
| 2004/0175597 A1* | 9/2004 | Litton ................ C04B 35/01 428/702 |
| 2005/0064146 A1 | 3/2005 | Hollis et al. |
| 2005/0238488 A1 | 10/2005 | Eastman et al. |
| 2006/0128548 A1 | 6/2006 | Carper et al. |
| 2006/0151856 A1 | 7/2006 | Torigoe et al. |
| 2007/0087211 A1* | 4/2007 | Endres ................ B23B 27/146 428/469 |
| 2007/0253817 A1 | 11/2007 | Bezencon et al. |
| 2007/0274837 A1 | 11/2007 | Taylor et al. |
| 2008/0085191 A1 | 4/2008 | Liang |
| 2008/0145629 A1 | 6/2008 | Anoshkina et al. |
| 2009/0017260 A1 | 1/2009 | Kulkarni et al. |
| 2009/0175571 A1* | 7/2009 | Boehm ................ C23C 4/02 384/625 |
| 2009/0324401 A1 | 12/2009 | Calla |
| 2010/0015399 A1 | 1/2010 | Coupland et al. |
| 2010/0047512 A1 | 2/2010 | Morrison et al. |
| 2010/0159151 A1 | 6/2010 | Kirby et al. |
| 2010/0166566 A1 | 7/2010 | Hatman |
| 2010/0272953 A1 | 10/2010 | Yankowich et al. |
| 2011/0014060 A1 | 1/2011 | Bolcavage et al. |
| 2011/0097538 A1 | 4/2011 | Bolcavage et al. |
| 2012/0230818 A1 | 9/2012 | Shepherd et al. |
| 2013/0122259 A1 | 5/2013 | Lee |

FOREIGN PATENT DOCUMENTS

| | | |
|---|---|---|
| DE | 19619438 A1 | 11/1997 |
| DE | 19824583 A1 | 12/1999 |
| DE | 102005050873 A1 | 4/2007 |
| EP | 0575685 A1 | 12/1993 |
| EP | 0661415 A1 | 7/1995 |
| EP | 0712940 A1 | 5/1996 |
| EP | 0935009 A1 | 8/1999 |
| EP | 1228898 A1 | 8/2002 |
| GB | 2155558 A | 9/1985 |
| GB | 2282856 A | 4/1995 |
| JP | 7003424 A | 1/1995 |
| WO | 9633837 A1 | 10/1996 |
| WO | 0159262 A1 | 8/2001 |
| WO | 03010419 A1 | 2/2003 |
| WO | 2007087989 A1 | 8/2007 |
| WO | 2009091721 A2 | 7/2009 |
| WO | 2009126194 A1 | 10/2009 |
| WO | 2010000795 A1 | 1/2010 |
| WO | 2013033323 A1 | 3/2013 |

OTHER PUBLICATIONS

International Preliminary Report on Patentability from International Application No. PCT/US2014/028440, dated Sep. 24, 2015, 6 pp.
Inghram et al., "Flame Spray Handbook (Formerly Metallizing Handbook)," vol. 1, Wire Process, METCO Inc., 1964, 27 pp. (Applicant points out that, in accordance with MPEP 609.04(a), the 1964 year of publication is sufficiently earlier than the effective U.S. filing date and any foreign priority date of Mar. 14, 2014 so that the particular month of publication is not in issue.).
Nissley et al., "Thermal Barrier Coating Life Modeling in Aircraft Gas Turbine Engines," Journal of Thermal Spray Technology, vol. 6, No. 1, Mar. 1997, 8 pp.
International Search Report and Written Opinion of counterpart international application No. PCT/US2014/028440, dated Jun. 17, 2014, 9 pp.

* cited by examiner

COATING INTERFACE

This application claims the benefit of U.S. Provisional Application No. 61/791,415, filed on Mar. 15, 2013, the entire content of which is incorporated herein by reference.

TECHNICAL FIELD

Embodiments of the present disclosure generally relate to coating interfaces, and more particularly, but not exclusively, to coating interfaces on composite substrates.

BACKGROUND

Present approaches to coating interfaces suffer from a variety of drawbacks, limitations, disadvantages and problems including those respecting adhesion and others. There is a need for the unique and inventive coating interface apparatuses, systems and methods disclosed herein.

SUMMARY

One embodiment of the present disclosure is directed to a unique coating interface. Other embodiments include apparatuses, systems, devices, hardware, methods, and combinations for coating interfaces. Further embodiments, forms, features, aspects, benefits, and advantages of the present application shall become apparent from the description and figures provided herewith.

The coating interface may be defined by the surface of a substrate, such as, e.g., a superalloy substrate or ceramic matrix composite substrate, onto which the coating is formed. A plurality of joint conduits may be formed into the surface, where the joint conduits have an undercut configuration. The coating may be formed on the surface of the substrate and may substantially fill the joint conduits, e.g., to provide for improved bond strength between the coating and substrate. Example coatings include environmental barrier coatings and thermal barrier coatings.

In one example, the disclosure relates to an article including a substrate defining an outer surface; a plurality of joint conduits formed in the outer surface of the substrate, wherein each conduit of the plurality of joint conduits exhibits an undercut configuration; and a coating formed on the outer surface of the substrate, wherein the coating substantially fills the plurality of joint conduits formed in the surface of the substrate.

In another example, the disclosure relates to a method for forming an article, the method comprising forming a plurality of joint conduits in an outer surface of a substrate, wherein each conduit of the plurality of joint conduits exhibits an undercut configuration; and forming a coating on the outer surface of the substrate, wherein the coating at least partially permeates the plurality of joint conduits formed in the surface of the substrate.

In another examples, the disclosure relates to a system comprising means for forming a plurality of joint conduits in an outer surface of a substrate, wherein each conduit of the plurality of joint conduits exhibits an undercut configuration; and means for forming a coating on the outer surface of the substrate, wherein the coating at least partially permeates the plurality of joint conduits formed in the surface of the substrate.

The details of one or more examples are set forth in the accompanying drawings and the description below. Other features, objects, and advantages will be apparent from the description and drawings, and from the claims.

DETAILED DESCRIPTION

Figure 1:
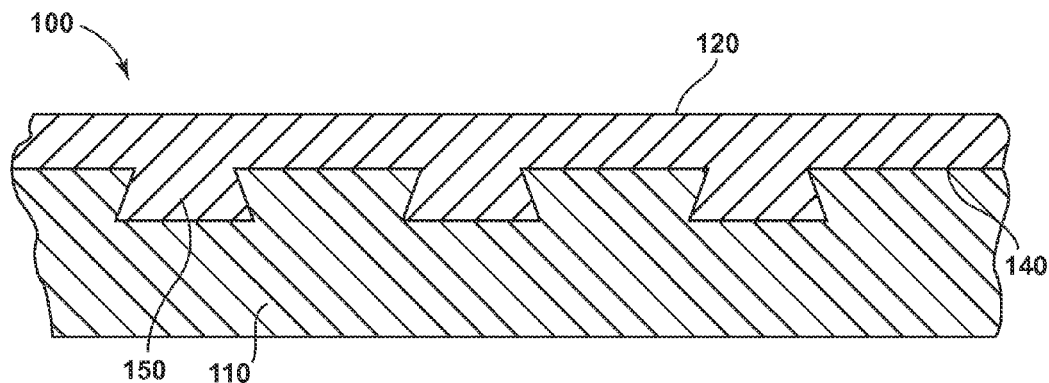
FIG. 1 is a cross sectional view of a composite substrate with a coating according to one embodiment of the present disclosure.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended. Any alterations and further modifications in the described embodiments, and any further applications of the principles of the disclosure as described herein are contemplated as would normally occur to one skilled in the art to which the disclosure relates.

With reference to FIG. 1, a cross sectional view of a portion 100 of a component is shown. Example of the component may include, but is not limited to, an air flow component of a gas turbine engine. Representative types of air flow components may include a blade, vane, blade track, combustion liner or airfoil. As shown, portion 100 includes a substrate 110 and a coating 120. At the interface of substrate 110 and coating 120 is a coating surface 140 having a number of joint conduits 150. Joint conduits 150 are designed to have interlocking geometry in order to mechanically entrap coating 120 and improve adhesion with substrate 110.

As will be described further below, joint conduits 150 may each exhibit an undercut configuration. One example undercut configuration is a dovetail configuration. In an undercut configuration, conduits 150 may be cut into coating surface at an angle greater than 90 degrees from the surface plane. In this sense, a width within the conduits parallel to the surface of the opening may be greater than the width at outer surface 140 defined by the opening of conduits 150. By utilizing undercut configurations, the surface area of conduits 150 may provide for increased surface area defined by conduits 150 compared to that of non-undercut configurations, such as, e.g., square cut or "V" cut configurations. Moreover, the mechanical adhesion between coating 120 and substrate 110 may be increased as the material of coating 120 within the undercut portion of conduits 150 must be fractured to remove coating 120 from substrate 110. In this manner, conduits 150 may provide for increased adhesion between coating 120 and substrate 110.

Substrate 110 may include various materials such as superalloys, fiber reinforced composite, ceramic matrix composite, metal matrix composite and hybrid materials. The substrate 110 may be a gas turbine engine component, e.g., operating at temperatures of 1900° to 2100° F., and may include high temperature resistant alloys based on Ni, Co, Fe and combinations thereof. Substrate 110 may be a ceramic material composite (CMC) applied to the high temperature operating components of gas turbine engine components. A substrate 110 with a CMC may have fibers shaped in a preform with a 2D or 3D structure and include materials such as carbon, silicon carbide aluminum boron silicide, and the like.

As noted above, substrate 110 may include a ceramic or ceramic matrix composite (CMC). In embodiments in which substrate 110 includes a ceramic, the ceramic may be substantially homogeneous and may include substantially a single phase of material. In some embodiments, a substrate 110 comprising a ceramic may include, for example, a silicon-containing ceramic, such as silica ($SiO_2$), silicon carbide (SiC) or silicon nitride ($Si_3N_4$), alumina ($Al_2O_3$), aluminosilicate, or the like. In other embodiments, substrate 110 may include a metal alloy that includes silicon, such as a molybdenum-silicon alloy (e.g., $MoSi_2$) or a niobium-silicon alloy (e.g., $NbSi_2$).

In embodiments in which substrate 110 includes a CMC, substrate 110 may include a matrix material and a reinforcement material. The matrix material may include a ceramic material, including, for example, silicon carbide, silicon nitride, alumina, aluminosilicate, silica, or the like. In some examples, the matrix material of the CMC substrate may include carbon, boron carbide, boron nitride, or resin (epoxy/polyimide). The CMC may further include any desired reinforcement material, and reinforcement material may include a continuous reinforcement or a discontinuous reinforcement. For example, the reinforcement material may include discontinuous whiskers, platelets, or particulates. As other examples, the reinforcement material may include a continuous monofilament or multifilament weave.

Coating 120 may be applied to CMC substrate 110 to protect against oxidation and corrosive attacks at high operating temperatures. Environmental barrier coatings have been applied to protect the ceramic composites. Adhesion of coating 120 to substrate 110 may influence coating's 120 ability to provide beneficial properties such as those described herein. Adhesion of coating 120 may be compromised due to a lack of chemical or physical attraction between substrate 110 and coating 120. Adhesion issues may also arise during operation of the component with a mismatch in thermal properties between substrate 110 and coating 120.

As shown in FIG. 1, coating 120 may be applied to operate as a thermal barrier coating (TBC), an environmental barrier coating (EBC), compliant layer or bonding enhancement layer. An EBC may include materials that are resistant to oxidation or water vapor attack, and/or provide at least one of water vapor stability, chemical stability and environmental durability to substrate 110. A TBC may include at least one of a variety of materials having a relatively low thermal conductivity, and may be formed as a porous or a columnar structure in order to further reduce thermal conductivity of the TBC and provide thermal insulation to substrate 110.

In various embodiments, coating 120 may include materials such as ceramic, metal, glass, pre-ceramic polymer and the like. In specific embodiments, coating 120 may include silicon carbide, silicon nitride, boron carbide, aluminum oxide, cordierite, molybdenum disilicide, titanium carbide, and metallics with molybdenum, geranium, silicon, titanium, iridium and the like. Coating 120 may be applied in a single layer or in multiple layers and applied by techniques such as plasma spray, PVD, CVD, DVD, dipping, spraying, electroplating, CVI and the like. In one embodiment of the present application, the composition of coating 120 may be selected based on coefficients of thermal expansion, chemical compatibility, thickness, operating temperatures, oxidation resistance, emissivity, reflectivity, and longevity. In another embodiment, coating 120 may be applied on selected portions of a component and only partially cover the substrate. In other embodiments, placement of coating 120 may depend on the application method and material cost, for example.

In embodiments where depressions are present and a smooth surface is intended, coating 120 may be altered by mechanical means such as grinding, machining, polishing, ablation by laser, or otherwise modified to achieve the intended surface. In other embodiments, additional layers may be applied to fill in any depressions. These processes may be used with a final coating surface or any intermediate surface. In one embodiment, coating 120 may include a single protective layer such as thermal or environmental barrier coatings. In other embodiments, coating 120 may include multiple layers having intermediate or bond layers in addition to protective layers.

An intermediate layer may be a coating layer that lies between the substrate and the protective or outer coating. Intermediate layers may operate, among other things, to prepare the substrate for the protective coating either physically or chemically, provide additional environmental/thermal protection, and aid adhesion of protective coating by providing a thermal mismatch transition core. A bond layer may be a coating between two layers that aids in adhesion of one layer to another. Bond coatings may be applied between a substrate and a protective coating, between a substrate and an intermediate layer, and between an intermediate layer and a protective coating, for example. Coating systems may include various numbers and types of coating applied to a substrate.

Joint conduits 150 are formed in coating surface 140 of substrate 110 and may be tailored for enhanced performance with interlocking geometry in response to parameters such as, but not limited to, substrate composition, coating material, thermal expansion properties, and surface features. In one embodiment, joint conduits 150 are formed in coating surface 140 of substrate 110 with coating 120 at least partially permeating joint conduits 150.

In one embodiment, the interlocking geometry of joint conduits 150 may mechanically link a portion of coating 120 for additional bond strength between coating 120 and substrate 110. In another embodiment, interlocking geometry may increase the interface area of coating surface 140 between coating 120 and substrate 110. In yet another embodiment, interlocking geometry may control stresses to reduce residual and/or operating stresses in one or more materials in the component system and may also impart beneficial stresses such as compression in coating 120.

Figure 2A:
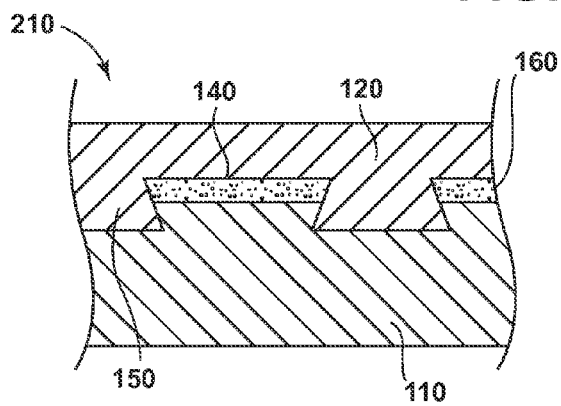
FIGS. 2A and 2B are cross sectional views of a composite substrate with multiple coatings according to another embodiment of the present disclosure.
Figure 2B:
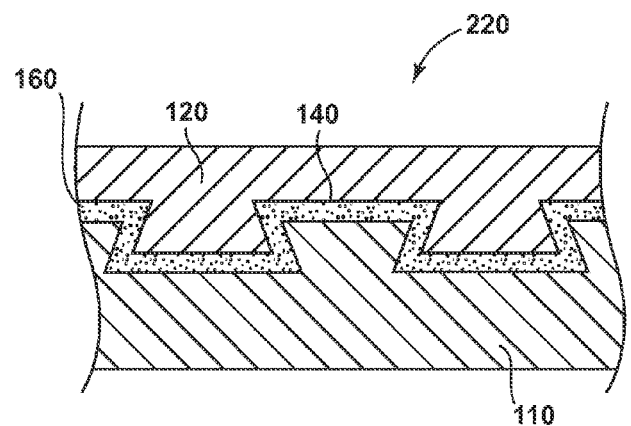

FIGS. 2A and 2B are cross sectional views showing embodiments with multiple or intermediate layers 160 that may be applied before or after joint conduits 150 are formed. The embodiment in FIG. 2A shows a portion 210 of a component with joint conduits 150 formed after intermediate layer 160 is applied to substrate 110. Coating 120 is then applied on top of intermediate layer 160, at least partially permeating joint conduits 150. The embodiment in FIG. 2B is shown with a portion 220 of a component where joint conduits 150 are formed in substrate 110 before intermediate layer 160 is applied. Intermediate layers 160 coat coating surface 140 and joint conduits 150 creating a continuous intermediate layer 160. Coating 120 then contacts only intermediate layer 160 permeating joint conduits 150 over intermediate layer 160. Though shown for simplicity sake with a single intermediate layer 160, multiple intermediate layers may also be provided.

Figure 3:
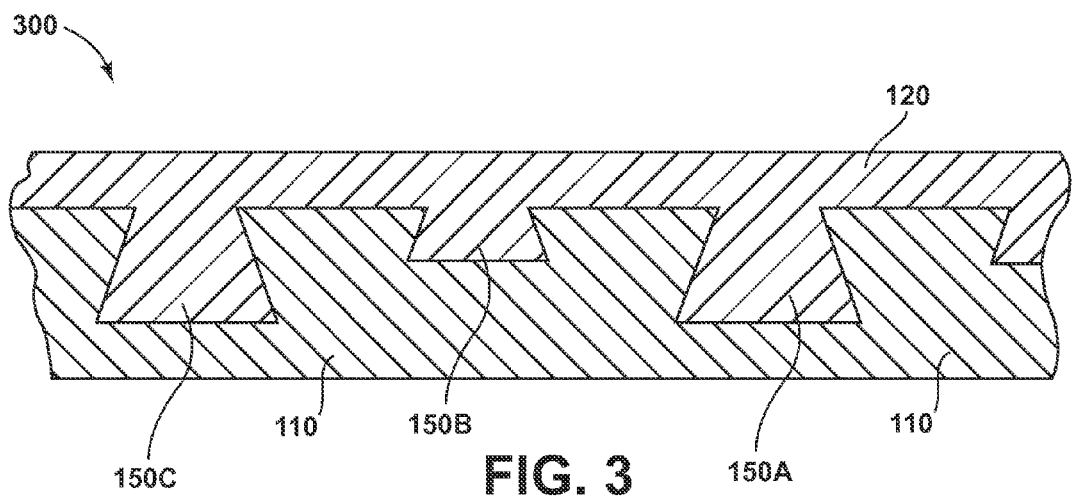
FIG. 3 is a cross sectional view of another embodiment of varying joint conduit geometry of the present disclosure.
Figure 4A:
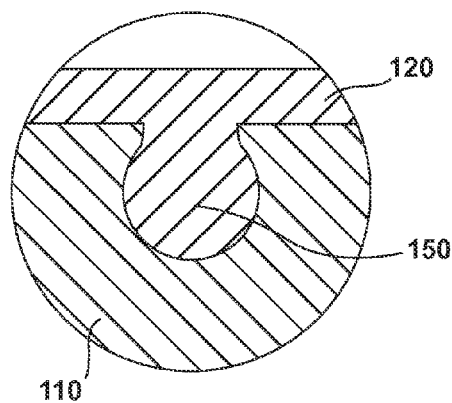
FIGS. 4A and 4B are cross sectional views of joint conduit geometry of embodiments of the present disclosure.
Figure 4B:
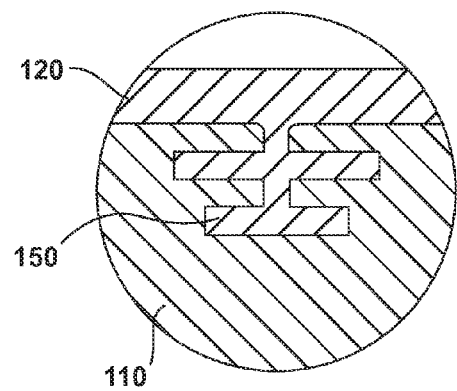

The interlocking geometry of joint conduits 150 may have geometries with various features including size, depth, profile and the like. Each of these features may vary within the same component and within the same joint conduit. FIG. 3 shows a portion 300 of a component in an embodiment of the present application where the depth of joint conduit 150 varies amongst conduits. A deep conduit 150A is shown deeper than a shallow conduit 150B. Width and shape of joint conduits 150 may vary as well. In other embodiments, variation may be between one conduit and the next, one portion of a component to another and/or along a single conduit. In various embodiments, interlocking geometry may include various shapes such as a trapezoid or concave (dovetail) shown in FIGS. 1-3. Other shapes are contemplated such as bulbous shown in FIG. 4A and re-entrant or convex (fir tree) shown in FIG. 4B.

Each of the cross-sections shown in FIGS. 1-3, 4A, and 4B are examples of conduits exhibiting an undercut configuration. As described above, in an undercut configuration, conduits 150 may be cut into coating surface at an angle greater than 90 degrees from the surface plane. In this sense, a width within the conduits parallel to the surface of the opening may be greater than the width at outer surface 140 defined by the opening of conduits 150. By utilizing undercut configurations, the surface area of conduits 150 may provide for increased surface area defined by conduits 150 compared to that of non-undercut configurations, such as, e.g., square cut or "V" cut configurations. Moreover, the mechanical adhesion between coating 120 and substrate 110 may be increased as the material of coating 120 within the undercut portion of conduits 150 must be fractured to remove coating 120 from substrate 110. In this manner, conduits 150 may provide for increased adhesion between coating 120 from substrate 110.

Dimensions and profiles may be selected when determining the interlocking geometry of the system. In some embodiments, depth or thickness of joint conduits 150 may vary from 50 um to 10 mm, for example, depending on the process and geometry selected. In one embodiment, depth may also vary within a single conduit depending on parameters such as component shape and coating location. In another embodiment, interlocking geometry would allow a mechanical bond or link to provide bond strength between substrate 110 and coating 120.

Figure 5A:
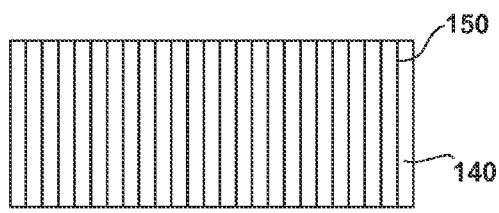
FIGS. 5A-5E are cross sectional views of joint conduit configurations of further embodiments of the present disclosure.

Conduit patterns on coating surface 140 may be varied as well. Patterns such as those shown in the embodiments of FIGS. 5A-5E may be applied with variations in joint conduit geometry. FIG. 5A demonstrates a linear pattern where geometry, depth and frequency may be varied. Joint conduits 150 are shown as substantially straight lines in coating surface 140 of substrate 110. The degree of linearity may vary both as part of the design and due to forming operations.

Figure 5B:
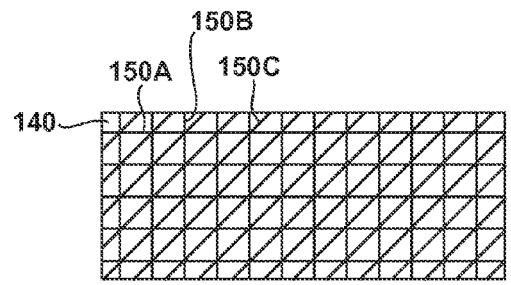

FIG. 5B demonstrates a linear pattern with multiple axial directions creating a tri-axial grid pattern. For this embodiment, joint conduits 150A are shown to run in a relatively 90° direction, joint conduits 150B are shown to run in a relatively 0° direction and joint conduits 150C are shown to run in a relative 45° direction. Variation in joint conduit spacing, number of conduit directions and relative angles may also be applied.

Figure 5C:
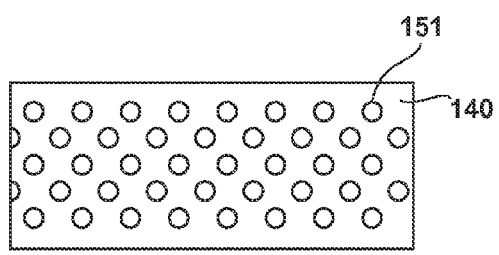

FIG. 5C demonstrates a conduit pattern that is closed-loop or circular. Multiple circular joint conduits 151 may be placed in regular or varying patterns in substrate 110. The circularity and diameter of circular joint conduits 151 may vary. Variation may depend on materials and/or forming processes.

Figure 5D:
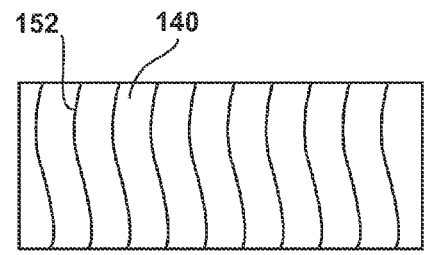

FIG. 5D demonstrates a conduit pattern that is serpentine with non-linear lines. Non-linear joint conduits 152 demonstrate an embodiment with a regular repeating non-linear pattern in substrate 110. Linearity, curvature, spacing and rotation of joint conduits 152, for example, are parameters that may be varied in different embodiments.

Figure 5E:
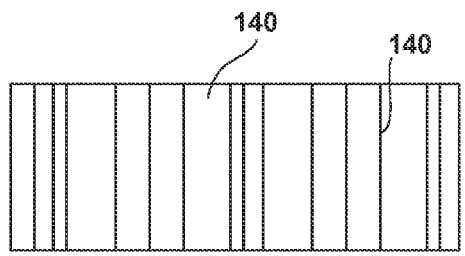

FIG. 5E demonstrates a conduit pattern that varies in frequency. Joint conduits 150 may be applied to substrate 110 in varying patterns, designs and configurations depending on material, component or surface geometry, forming processes and other parameters. In one specific embodiment, variable spacing joint conduits 150 as in FIG. 5E may be applied when substrate 110 undulates and the frequency of joint conduits 150 varies with the rise and fall of substrate 110. Joint conduit pattern variations may include linearity, depth, spacing, frequency, and angle of intersection. The grid orientation of a joint conduit pattern of one particular embodiment may be selected to minimize strength reduction in a component. For example, conduits in a blade airflow component may be oriented along the blade's span instead of around the chord.

Figure 6:
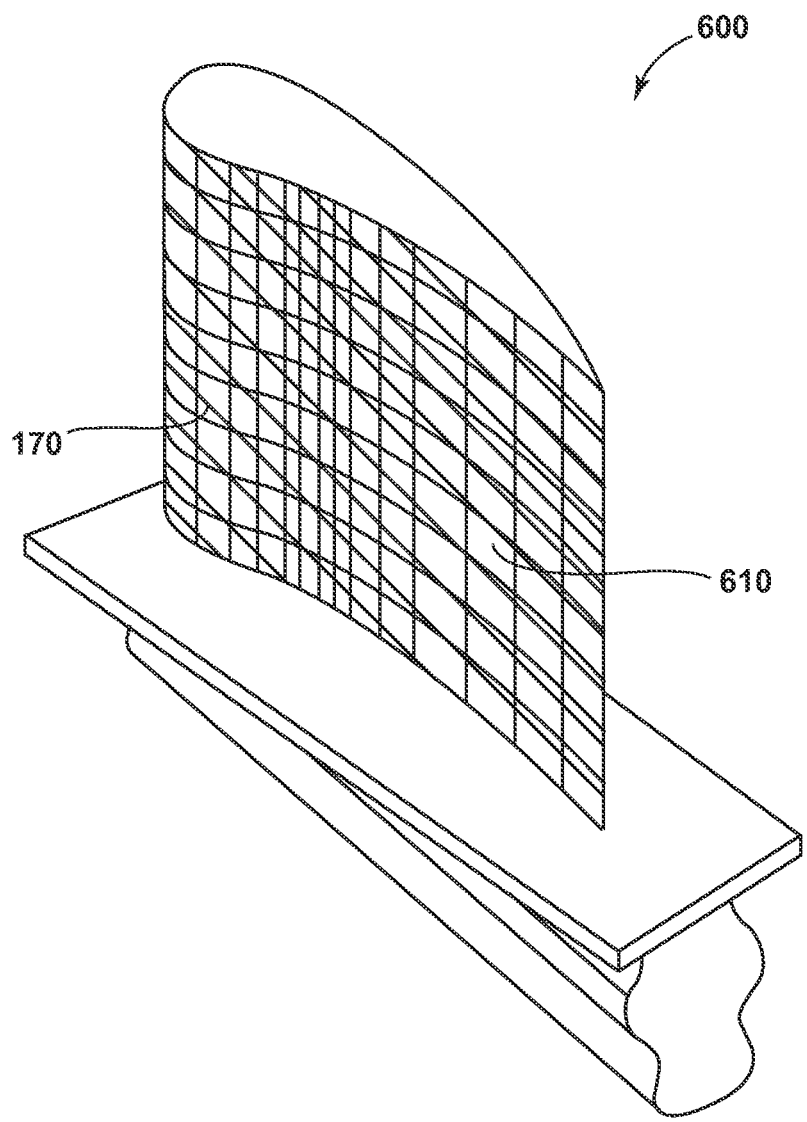
FIG. 6 is a perspective view of one embodiment of joint conduit configuration of the present disclosure applied to a turbine vane.

FIG. 6 shows an embodiment applied to a blade component 600. In this embodiment, joint conduits 170 are formed in a tri-axial based grid with spacing variation along a pressure side 610 of blade component 600. The variation may be optimized for the curvature and the operating forces of pressure side 610.

Methods of manufacturing of joint conduits 150 may be accomplished with conventional grinding, laser machining, electro-discharge machining (EDM), ultrasonic grinding, concentrated/masked grit blasting. In fiber reinforced composites, joint conduits 150 may be constructed as part of the preform in the composite manufacturing process for substrate 110. Depending on the selected geometry of an embodiment, 2D or 3D structures may include joint conduit geometry in the preform design. In some examples, conduits 150 may be formed in substrate via milling with a shaped tool.

Figure 7:
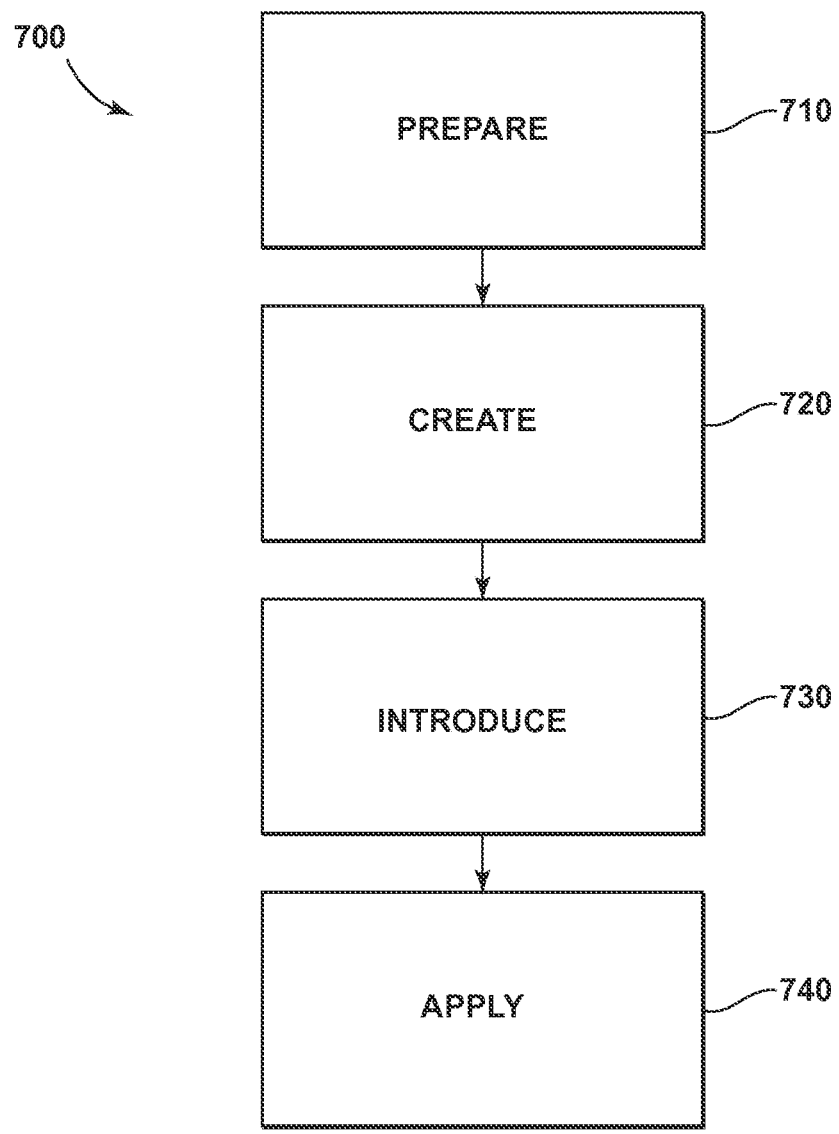
FIG. 7 is a process flow diagram of an embodiment of a coating process the present disclosure.

FIG. 7 shows a process flow diagram for a process 700 of producing a coated substrate according to an embodiment with a fiber reinforced composite substrate. One example of a process may include preparing a fiber reinforced preform of a substrate (710). Preparation may include forming techniques such as but not limited to laying up, braiding, filament winding, 2D placement and stitching and the like. The preform may have a 2D or 3D structure.

Next, the shape of the joint conduit in the preform is selected and created (720) to have an interlocking geometry. Creating the shape in the preform may produce a substrate with the interlocking geometry of the joint conduits without reducing component integrity by machining after forming. The shape of the joint conduits may vary in profile, depth, thickness etc. as previously discussed. In an alternative, an optional determination operation (not shown) may be included in process 700. A determination operation may be used to determine the interlocking geometry to be applied in response to various parameters such as coating material, substrate composition, component, intended application, coefficient of thermal expansion, and the like as previously discussed.

After creating the shape of the joint conduit, a material is introduced to the preform (730) thereby creating the component or substrate. The matrix material may be applied with various methods such as but not limited to deposition (chemical, vapor, electrophoretic), chemical reaction and polymer pyrolysis. A coating is applied (740) to the substrate where the coating substantially covers the substrate and at least partially permeates the joint conduits. As the coating permeates the joint conduits formed in the substrate, a mechanical link is formed between the coating and the substrate improving bond strength. The joint conduit with the selected interlocking geometry mechanically entraps the portion of the coating that at least partially permeates the joint conduit.

Optionally, the surface may be prepared after introducing the matrix material to the preform including the joint conduit shape in operation 730 but before applying the coating in operation 740. Surface prep may include various processes as may be determined by one skilled in the art. Surface treatment may also be optionally applied following applying the coating in operation 740 depending on the surface characteristics. Additional techniques may be used or additional material (coating or filler) may be added to the component to address any unevenness due to the joint conduits as previously discussed.

EXAMPLES

Example 1

A turbine blade track of SiC/SiC CMC was manufactured applying an embodiment of the present application where the surface that is swept by the blades exhibited regular CMC texture. A surface was prepared with straight, dovetail joint conduits being approximately 0.020" deep, 0.020" wide at the top with an 80° included angle and a 0.1" center to center distance.

Example 2

A turbine blade with a typical multilayer environmental barrier coating was manufactured with joint conduits having trapezoidal geometry and a tri-axial grid pattern on the leading edge and pressure surface similar to the component shown in FIG. 6. The joint conduits were approximately 0.015" deep, 0.030" wide with a conduit spacing of 0.2" center to center going to 0.1" center to center on the leading edge. The closer spacing resulted in improved adhesion and improved damage control.

While the disclosure has been illustrated and described in detail in the drawings and foregoing description, the same is to be considered as illustrative and not restrictive in character, it being understood that only the preferred embodiments have been shown and described and that all changes and modifications that come within the spirit of the disclosures are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the disclosure.

The invention claimed is:

1. An article of a gas turbine engine, the article comprising:
   a ceramic substrate defining an outer surface and having at least a first portion and a second portion, wherein the first portion has a greater absolute curvature around an axis of curvature than the second portion;
   a plurality of joint conduits formed in the outer surface of the ceramic substrate, wherein each conduit of the plurality of joint conduits exhibits an undercut configuration, and wherein the plurality of joint conduits has a variation in joint conduit spacing of joint conduits in an axial direction parallel to the axis of curvature;
   a coating formed on the outer surface of the ceramic substrate, wherein the coating at least partially permeates the plurality of joint conduits formed in the outer surface of the ceramic substrate; and
   an intermediate layer formed on a least a portion of the outer surface of the ceramic substrate, the intermediate layer between the coating and the ceramic substrate,
   wherein the variation in joint conduit spacing of joint conduits in the axial direction parallel to the axis of curvature includes a higher frequency of joint conduit spacing in the first portion than the second portion of the ceramic substrate.

2. The article of claim 1,
   wherein the plurality of joint conduits are arranged in a tri-axial based grid pattern in the outer surface of the ceramic substrate, and
   wherein the tri-axial based grid pattern includes an axial direction at relatively 0°, an axial direction at relatively 90 degrees, and an axial direction between relatively 0 degrees and 90 degrees.

3. The article of claim 1, wherein the undercut configuration comprises at least one of a bulbous configuration or re-entrant configuration.

4. The article of claim 1, wherein each conduit of the plurality of joint conduits defines a depth between 50 micrometers and 10 millimeters.

5. The article of claim 1, wherein the plurality of joint conduits exhibit an interlocking geometry in order to mechanically entrap the coating on the outer surface of the ceramic substrate.

6. The article of claim 1, wherein the ceramic substrate is a ceramic matrix composite substrate.

7. The article of claim 1, wherein the coating comprises an environmental barrier coating.

8. The article of claim 1, wherein the coating comprises a thermal barrier coating.

9. The article of claim 1, wherein the article comprises an air flow component of the gas turbine engine.

10. The article of claim 1, wherein the intermediate layer comprises a bond coating configured to increase adhesion between the coating and the ceramic substrate.

11. The article of claim 1, wherein the intermediate layer comprises a substantially continuous layer formed on the outer surface of the ceramic substrate.

12. The article of claim 1, wherein the intermediate layer comprises a discontinuous layer formed on only a portion of the outer surface of the ceramic substrate.

13. The article of claim 1, wherein the intermediate layer is formed on the outer surface of the ceramic substrate adjacent the plurality of conduits and not in the plurality of conduits.

14. The article of claim 1, wherein the plurality of conduits includes a first conduit having a first geometry and a second conduit having a second geometry different from the first geometry.

15. The article of claim 14, wherein the first conduit has a first depth and the second conduit has a second depth different from the first depth.

16. The article of claim 1, wherein each conduit of the plurality of joint conduits defines a depth between 50 micrometers and 508 micrometers.

17. The article of claim 1, wherein the plurality of joint conduits are arranged in a uni-axial based pattern.

18. A method for forming an article of a gas turbine engine, the method comprising:
- forming a plurality of joint conduits in an outer surface of a ceramic substrate having at least a first portion and a second portion, wherein the first portion has a greater absolute curvature around an axis of curvature than the second portion, wherein each conduit of the plurality of joint conduits exhibits an undercut configuration, and wherein the plurality of joint conduits has a variation in joint conduit spacing of joint conduits in an axial direction parallel to the axis of curvature;
- forming an intermediate layer on a least a portion of the outer surface of the ceramic substrate, the intermediate layer between a coating and the ceramic substrate; and
- forming the coating on the outer surface of the ceramic substrate, wherein the coating at least partially permeates the plurality of joint conduits formed in the outer surface of the ceramic substrate,
- wherein the variation in joint conduit spacing of joint conduits in the axial direction parallel to the axis of curvature includes a higher frequency of joint conduit spacing in the first portion than the second portion of the ceramic substrate.

* * * * *